Dec. 1, 1970     H. E. JARMAN     3,544,401
HIGH DEPTH-TO-WIDTH RATIO ETCHING PROCESS
Filed May 16, 1967     2 Sheets-Sheet 1
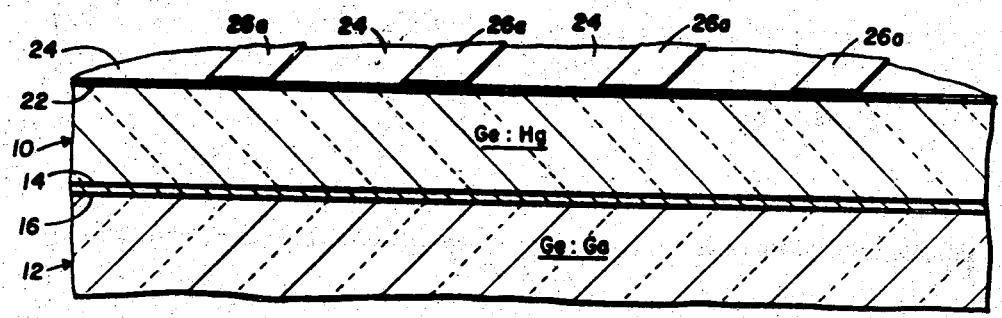
FIG. 1
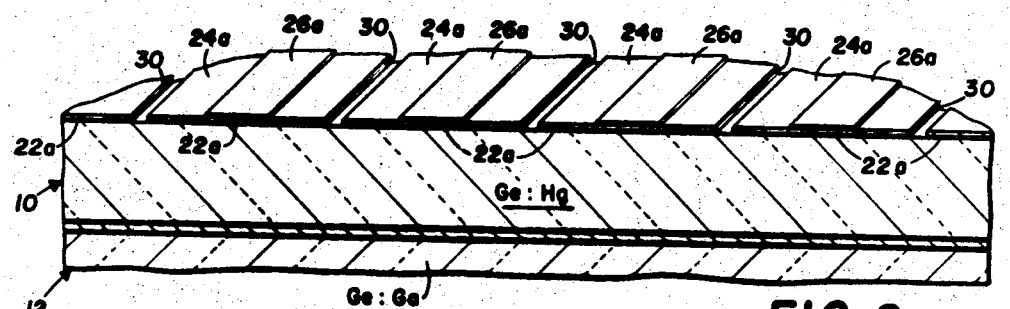
FIG. 2
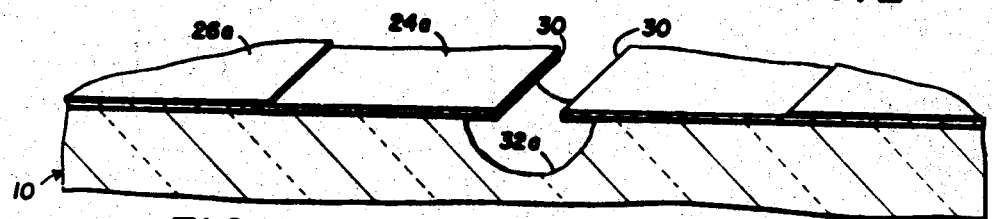
FIG. 3
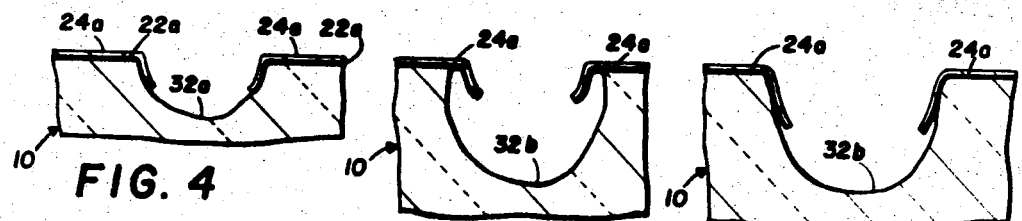
FIG. 4     FIG. 5     FIG. 6
FIG. 7
INVENTOR
HALL E. JARMAN
ATTORNEY

3,544,401
HIGH DEPTH-TO-WIDTH RATIO ETCHING PROCESS

Hall E. Jarman, Dallas, Tex., assignor to Texas Instruments Incorporated, Dallas, Tex., a corporation of Delaware
Filed May 16, 1967, Ser. No. 638,914
Int. Cl. C23f *1/02;* H01l *7/50*
U.S. Cl. 156—17                                                                  6 Claims

ABSTRACT OF THE DISCLOSURE

A process for etching semiconductor material and the like by forming a malleable etching mask on the surface of the material which has an opening exposing the material that is substantially narrower than the desired depth of the etch, and periodically bending the edges of the mask down over the sides of the etched cavity as the cavity is deepened by an etching fluid to retard etching of the side walls and decrease the width of the etched cavity.

---

Figure 8:
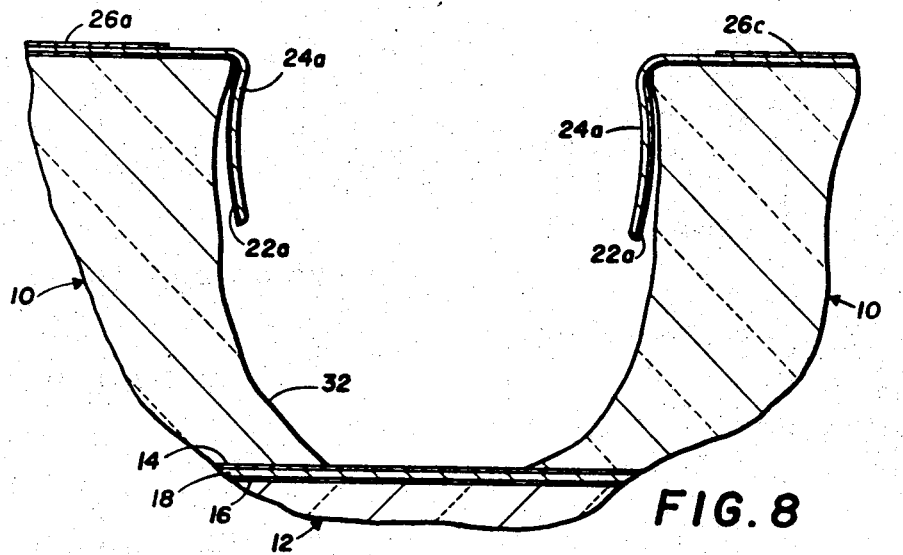

This invention relates generally to chemical etching, and more particularly to an etching process especially useful in fabricating semiconductor devices.

There are many instances in the semiconductor industry where it is desirable to perform a deep etch in a semiconductor material while using a minimum surface area. For example, it is desirable to form an infrared detector array having a large number of detector elements with very small, square cross sections arranged in a row with minimum spacing, preferably no wider than the width of the detector element. One possibility for separating a slice of thin detector material into detector bars is to etch through the slice. However, this is not possible using conventional etching techniques because such techniques have a low depth-to-width etch ratio and result in grooves having a much greater width than depth. Further, the grooves are usually much wider at the top than at the bottom, resulting in an undesirable cross-sectional configuration for the remaining detector bars.

There are many other instances where it is desirable to etch completely through a relatively thin semiconductor layer or slice in order to divide the slice into separate parts. For example, it is often desirable to separate integrated circuits formed on a single slice into individual semiconductor devices. This is particularly true in the more recently developed beam lead technology where beam leads are deposited on one surface of the slice, and the slice is then etched through from the opposite surface to leave the beam leads projecting from the edges of the resulting semiconductor bars. It is also desirable to divide semiconductor layers epitaxially grown on high or low resistivity substrates or semiconductor slices alloyed to high or low resistivity substrates into individual mesas for electrical isolation, or for etching deep narrow moats in the surface of a slice of semiconductor material pursuant to the reverse lapping process. In general, such a process is also useful in fabricating light emitter and light sensing arrays, resistive heating element arrays, phased antenna arrays, etc.

This invention is concerned with a process for etching a relatively narrow, relatively deep cavity in a semiconductor body or other material in order to provide a means for separating thin slices or layers of semiconductor or other material while using a minimum surface area and also achieving sides of the etch cavity that are substantially straight and normal to the surface of the body. This is achieved in accordance with this invention by using a malleable etching mask having an opening exposing the material to be etched that is substantially narrower than the ultimate etch cavity. An etching fluid, either liquid or gas, is directed through the opening in the mask against the material to be etched. Periodically the edges of the malleable mask that overhang the cavity being etched are bent downwardly against the side walls of the etched cavity to retard the etching rate on the side walls while simultaneously increasing the etch rate on the bottom of the cavity due to increased exposure.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGS. 1 and 2 are isometric views, in section, illustrating the masking of a semiconductor slice in accordance with the process of the present invention; and FIGS. 3–11 are somewhat schematic sectional views, some also being isometric, which illustrate the process in accordance with the present invention.

It is to be understood that the process of this invention is broadly applicable to the etching of any substance. However, the process is particularly applicable to the etching of semiconductor material, and the process as it is used in the fabrication of a mercury doped germanium infrared detector array has been selected as the illustrative embodiment, which will now be described in detail.

The structure illustrated in FIG. 1 was fabricated as follows. A slice of semiconductor infrared detector material, indicated generally by the reference numeral 10 in FIG. 1, is typically about one inch in diameter and was initially about 0.010 inch thick. The slice 10 is typically germanium doped with mercury in a manner known in the art.

A high conductivity substrate indicated generally by the reference numeral 12 is a degenerate form of the same semiconductor material as the slice 10, and is preferably germanium doped with gallium or arsenic to a level such that the semiconductor is degenerate and has a resistance of about 0.0007 ohm-centimeter. The surfaces of both the slice 10 and the substrate 12 are preferably parallel to the (111) plane of the semiconductor crystal.

One surface of the slice 10 and one surface of the substrate 12 were mechanically-chemically lapped and polished using a Clorox-water polishing solution (1:1.75), then degreased with a commercial solvent and dried in an oven. The slice 10 and substrate 12 were then placed in a vacuum evaporator and a thin layer 14 of chromium deposited on the polished surface of the slice 10, and a thin layer 16 of chromium deposited on the polishing surface of the substrate 12, followed by a thicker layer of gold on each. The slice 10 was then inverted and placed on the substrate 12 with the gold layers in contact. The stack was weighted and placed in an oven where it was heated to about 425° C. to melt the gold, then slow cooled to about 200° C. over a period of five or six minutes to alloy the slice 10 to the substrate 12 by the gold layer 18.

After the slice 10 was alloyed to the substrate 12, the exposed surface of the slice 10 was lapped and polished using the water-Clorox solution in the mechanical-chemical lapping apparatus. The mercury doped germanium laps away at a rate of about 0.001 inch per hour, thus providing a means for closely controlling the ultimate thickness of the mercury doped germanium slice 10. The slice 10 was lapped until it had a thickness corresponding to the ultimate dimensions desired for the individual infrared detector elements. Thus, if each element is to be 0.002 inch square, for example, the slice 10 is lapped until it is 0.002 inch thick. The substrate 12 and slice 10 were then degreased and baked out in the conventional manner to remove impurities.

Next, the substrate 12 and slice 10 were placed in an evaporator and a thin layer 22 of chromium was vacuum deposited on the polished surface of the mercury doped germanium slice 10 followed by a thicker layer 24 of gold. These two layers were deposited with the slice 10 at about 150° C. The purpose of the chromium layer 22 is to adherently bond the gold layer 24 to the germanium slice 10. The gold layer 24 will first serve the function of an etching mask, and ultimately the function of an electrical contact. The slice 10 was then cooled to room temperature and a second relatively thin chromium layer 26 was vacuum deposited on the gold layer 24. The second chromium layer 26 is deposited at room temperature because its sole purpose is to serve as an etching mask for the gold layer 24, and it will ultimately be removed as will hereafter be described.

The second chromium layer was then patterned using a conventional photolithographic technique to leave strips 26a, thus producing the structure shown in FIG. 1. This was achieved by using a standard photo-resist such as KMER to mask the chromium strips 26a, and a 1:1 solution of hydrochloric acid and methyl alcohol which selectively etches the chromium in preference to the underlying gold layer 24. Zinc dust is sprinkled on the chromium to activate the etching process. Gold layer 24 protects the first chromium layer 22. If the ultimate dimension of the infrared detector elements is to be 0.002 by 0.002 inch, then the chromium strips 26a extend in parallel relationship across the entire slice, are spaced on 0.004 inch centers or the desired centers of the individual detector elements and are about 0.0015 inch wide.

Next, the gold layer 24 and the first chromium layer 22 are selectively removed to leave gold strips 24a overlying chromium strips 22a and to form slots 30 which expose the underlying mercury doped germanium slice 10, as shown in FIG. 2. This is achieved using a photolithographic technique in which the chromium strips 26a and the gold layer 24 are protected by a photo-resist, such as KMER, and the gold is selectively removed using a potassium, iodide and water solution having excess iodide, and the chromium removed by the hydrochloric acid and methyl alcohol solution previously mentioned. After the slots 30 are formed, the phot-resist is removed.

Next, the substrate 12 is mounted on a suitable holder, such as by waxing the bottom of the substrate 12 and pressing the wax against a gold plate. The slice 10 is then disposed in inverted position in an upwardly directed geyser of a suitable etching fluid for the germanium, such as a hydrofluoric acid solution. The etching rate of the germanium in the hydrofluoric acid is about 0.0005 inch per minute. The hydrofluoric acid is ineffectual against either the chromium strips 26a or the gold strips 24a, and thus etches only the portion of the germanium slice 10 exposed through slots 30.

In order to assure uniform etching, the slice 10 was rotated 90° every ten seconds. Then after about thirty seconds when a grove 32a had been etched as illustrated in FIG. 3, the slice 10 was removed from the etchant stream, held under water, and brushed along the length of the slots 30 with a soft, fine-bristled paint brush. The purpose of the brushing is to bend the edges of the malleable gold strips 24a and the underlying chromium strips 22a downwardly into the groove 32a etched in the germanium slice and against the side walls of the grooves as shown in FIG. 4. Then when the slice is placed back in the etchant stream, the downturned metal layers partially mask the side walls of the grove 32a, thus retarding the etch rate of the side walls while permitting accelerated etching of the bottom of the groove due to the increased size of the opening. This procedure is repeated every thirty seconds until the desired depth is reached. An attempt has been made to illustrate the effects of this procedure in FIGS. 5–8. FIG. 5 illustrates the cross-sectional configuration of the etched groove 32b after the next etch cycle. FIG. 6 shows the position of the edges of the metal mask after the following brushing cycle, and FIG. 7 illustrates the shape of the groove 32c after a later etch cycle. Finally, FIG. 8 illustrates the cross-sectional configuration of the groove 32 after the slice has been etched completely through to the chromium layer 14.

Figure 9:
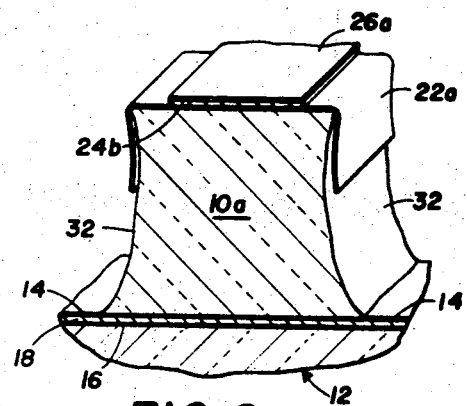
Figure 10:
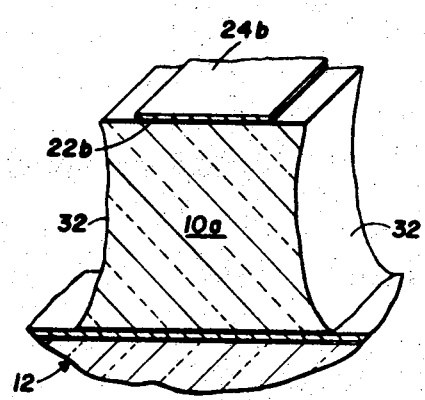
Figure 11:
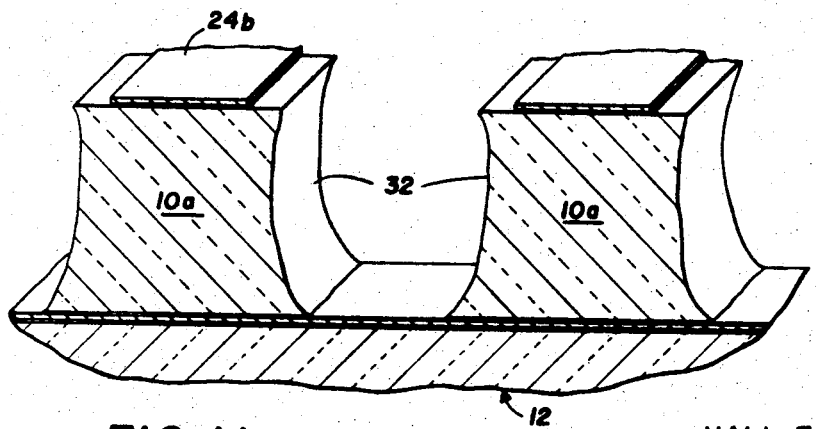

Next, the portion of the gold strip 24a that is unprotected by the chromium strips 26a is removed using the potassium iodide etching solution, thus leaving gold strips 24b substantially as illustrated in FIG. 9. Then the chromium strips 26a and the portion of the chromium strips 22a that are unprotected by the remaining gold strips 24b are removed using the hydrochloric acid and methyl alcohol etching solution. This leaves the gold strips 24b exposed to provide electrical contact with the individual detector bars 10a, as illustrated in FIG. 10. The remaining portions of the chromium layer 22 underlying the gold strips 24b enhance the mechanical bond between the gold and the detector bars 10a.

Although gold has been illustrated as the masking material, it should be understood that other metals, or other materials which are not excessively attacked by the etching fluid and which have sufficient malleability to be bent downwardly against the side walls to at least partially protect the side walls may be used for this purpose. The mask may also be bent downwardly by any suitable means, such as the force of a fluid stream, or a jet of nitrogen or other nondetrimental gas. The etched cavity may have substantially any surface geometry, and may or may not extend completely through the layer or slice of material.

The present invention has been described with regard to a malleable mask applied to a surface of a semiconductor body. However, the mask according to the invention may be applied to a semiconductor surface on which are an insulator and lead pattern. For example, in the case of providing moats for isolation, a first KMER coating would be placed over the oxide and lead pattern on the component side of the integrated circuit. Openings are formed in the KMER above the locations where the moats are to be formed. The gold mask is applied over the surface and in the openings. A second KMER coating is applied over the mask and developed leaving openings above the previous ones for removing the gold in these openings and leaving a malleable gold mask. After the gold is removed to form the mask, the second KMER coating is removed and the oxide exposed by the openings is removed. The exposed semiconductor material is then etched according to the invention.

Although a preferred embodiment of the invention has been described in detail, it is to be understood that various changes, substitutions and alterations can be made therein without departing from the spirit and scope of the invention as defined by the appended claims.

What is claimed is:

1. The process for making a high depth-to-width ratio etch in a surface of a semiconductor body which comprises:
   forming on the surface of said semiconductor body a malleable metal etching mask having an opening which exposes a selected area of the surface;
   subjecting the exposed area of the surface to a stream of a selective etching fluid directed through the opening thereby forming a cavity in the semiconductor body; and
   concurrently with the formation of said cavity bending the edges of the mask left overhanging the cavity along the sides of the undercut area partially protecting the side walls from contact by the etching fluid.

2. The process for making a high depth-to-width ratio etch in a surface of a semiconductor body which comprises:
- vacuum depositing a malleable metal layer over the surface of said semiconductor body;
- selectively removing the metal layer in preselected areas to form openings which expose the surface of the semiconductor body thereby forming a malleable metal etching mask;
- subjecting the exposed area of the surface to a stream of etching fluid directed through the opening thereby forming a cavity in the body; and
- concurrently with the formation of said cavity bending the edges of the mask left overhanging the cavity along the sides of the undercut area thereby partially protecting the side walls from contact by the etching fluid.

3. The process for making a high depth-to-width ratio etch in a surface of a semiconductor body which comprises:
- vacuum depositing a first malleable metal layer over the surface of said semiconductor body;
- vacuum depositing a second malleable metal layer on the surface of the first metal layer;
- selectively removing the second metal layer in preselected areas, leaving said second layer only in areas under which the semiconductor body is to be retained and an electrical contact is to be formed;
- selectively removing the first metal layer in preselected areas to form openings which expose the surface of the semiconductor body thereby forming a malleable metal etching mask;
- subjecting the exposed area of the surface to a stream of etching fluid directed through the opening thereby forming a cavity in the body;
- periodically removing the body from the etching fluid and bending the edges of the mask left overhanging the cavity along the sides of the undercut area thereby partially protecting the side walls from contact by the etching fluid; and
- selectively removing the portions of the first metal layer not protected by the second metal layer to form a contact on the remaining surface of the semiconductor body.

4. The process for making a high depth-to-width ratio etch in a surface of a semiconductor body which comprises:
- vacuum depositing a first gold-comprising metal layer over the surface of said semiconductor body;
- vacuum depositing a second chromium-comprising metal layer on the surface of the first metal layer;
- selectively removing the second metal layer in preselected areas, leaving said second layer only in areas under which the semiconductor body is to be retained and an electrical contact is to be formed;
- selectively removing the first metal layer in preselected areas to form openings which expose the surface of the semiconductor body thereby forming a malleable metal etching mask;
- subjecting the exposed area of the surface to a stream of etching fluid directed through the opening, thereby forming a cavity in the body;
- periodically removing the body from the etching fluid and bending the edges of the malleable mask left overhanging the cavity along the sides of the undercut area thereby partially protecting the side walls from contact by the etching fluid; and
- selectively removing the portions of the first metal layer not protected by the second metal layer to form a contact on the remaining surface of the semiconductor body.

5. The process defined in claim 2 wherein the vacuum deposited metal layer is electrically conductive.

6. The process defined in claim 5 wherein the electrically conductive metal layer is comprised of gold and further characterized by utilizing remaining portions of the mask, after the etching steps have been completed, as electrical contacts on the surface of each individual element which has been formed as a result of the etched grooves.

References Cited
FOREIGN PATENTS
863,065 3/1961 Great Britain.

JACOB H. STEINBERG, Primary Examiner

U.S. Cl. X.R.
156—12, 13, 8